(12) United States Patent
Nate et al.

(10) Patent No.: US 7,431,873 B2
(45) Date of Patent: Oct. 7, 2008

(54) METHOD FOR MANUFACTURING HONEYCOMB STRUCTURE

(75) Inventors: Masayuki Nate, Nagoya (JP); Takahisa Kaneko, Nagoya (JP); Yukihisa Wada, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 814 days.

(21) Appl. No.: 10/506,967

(22) PCT Filed: Feb. 5, 2003

(86) PCT No.: PCT/JP03/01160

§ 371 (c)(1),
(2), (4) Date: Sep. 8, 2004

(87) PCT Pub. No.: WO03/082537

PCT Pub. Date: Oct. 9, 2003

(65) Prior Publication Data

US 2005/0167880 A1    Aug. 4, 2005

(30) Foreign Application Priority Data

Mar. 28, 2002    (JP) .............................. 2002-092682

(51) Int. Cl.
*B28B 21/52* (2006.01)
(52) U.S. Cl. ............................ 264/177.12; 264/177.17; 264/177.19
(58) Field of Classification Search ............ 264/177.12, 264/177.17, 177.19
See application file for complete search history.

(56) References Cited

FOREIGN PATENT DOCUMENTS

| EP | 0 260 703 A1 | 3/1988 |
|---|---|---|
| JP | A 2001-19533 | 1/2001 |
| JP | A 2001-130973 | 5/2001 |

OTHER PUBLICATIONS

Translation of EPO 260703 dated Mar. 1988.*

* cited by examiner

*Primary Examiner*—Robert B Davis
(74) *Attorney, Agent, or Firm*—Oliff & Berridge, PLC

(57) ABSTRACT

The present invention provides a method for manufacturing a honeycomb structure, the method including steps of: forming, by extrusion, a formed body 1 having an outer wall, partition walls provided inside the outer wall, and cells each surrounded by the partition walls as well as extending to an axial direction of the body; and drying the formed body 1. The method for manufacturing the honeycomb structure is characterized in that the forming step includes receiving the formed body on a cradle 10 which receives the formed body so that an angle of a face 7a of the outer wall on the cradle 10 relative to the horizontal plane is 15 to 35 degrees, a cradle which has a V-shaped cross section with a cut at an apex of the V shape and which receives the formed body so that the angle relative to the horizontal plane is 15 to 45 degrees, or a cradle which receives one face of the formed body and characterized in that the drying step includes drying the formed body 1 in a state of being received on the cradle 10 having the predetermined angle. The method for manufacturing the honeycomb structure reduces distortion and deformation of the honeycomb structure.

13 Claims, 7 Drawing Sheets

DIAL GAUGE

METHOD FOR MANUFACTURING HONEYCOMB STRUCTURE

TECHNICAL FIELD

The present invention relates to a method for manufacturing a honeycomb structure. Particularly, the present invention relates to a method for manufacturing a honeycomb structure, which can inhibit distortion and cross sectional deformation of a honeycomb structure in a forming step or a drying step of the method.

BACKGROUND ART

A honeycomb structure is widely used for catalyst carriers and various filters. Recently, the honeycomb structure gets attention as a filter for trapping particulate matter exhausted from diesel engine (hereinafter referred to as DPF).

Such a honeycomb structure generally contains ceramics as a main component in many cases. Following method is generally taken for producing the honeycomb structure. After adding several kinds of additives to the ceramic raw material to form clay, the clay is extruded to form honeycomb formed body, then the formed body is dried and fired to obtain the honeycomb structure.

In the forming step and the drying step in such a producing method, deformation such as distortion and a twist of the formed body occurs. The honeycomb structure is divided into a plurality of honeycomb-structure segments in basic shapes of rectangular prisms and the segments are joined to and integrated with each other in some cases. In such cases, it is difficult to join the segments to each other when deformation such as distortion and twists occur in the respective segments.

As a method for inhibiting distortion and the like in drying, there is a method for drying a ceramic formed body having a honeycomb structure by using a drying jig having an upper jig and a lower jig equipped with pressure applying means, the applied pressure being preferably 0.4 to 0.6 MPa as disclosed in Japanese Patent Application Laid-open No. 2001-130973. There is a drying jig having two separate jigs formed in such a way that they enclose in a closely contacted state nearly the whole surface of sides parallel to a longitudinal direction of a ceramic formed body having a honeycomb structure as disclosed in Japanese Patent Application Laid-open No. 2001-19533. In these methods, though the distortion of the formed body can be inhibited, cells may be collapsed in some cases, which may result in cross sectional deformation of the formed body. In these methods, deformation in a forming step is not taken into consideration at all.

DISCLOSURE OF THE INVENTION

The present invention has been made in view of such a situation, and aims at providing a method for manufacturing a honeycomb structure which can reduce distortion and cross sectional deformation of a finished honeycomb structure by reducing them in a forming step or a drying step of the method.

The present invention provides first a method for manufacturing a honeycomb structure, the method comprising steps of: forming, by extrusion, a formed body having an outer wall, partition walls provided inside the outer wall, and cells each surrounded by the partition walls as well as extending to an axial direction of the body; and drying the formed body, characterized in that the forming step comprises a step of receiving the formed body being extruded on a cradle so that an angle of at least one face of the outer wall relative to the horizontal plane is 15 to 35 degrees; and the drying step comprises a step of drying the formed body in a state of being received on the cradle (the first aspect). In the first aspect, the cradle preferably has two faces forming a V-shaped cross section.

The present invention provides second a method for manufacturing a honeycomb structure, the method comprising steps of: forming, by extrusion, a formed body having an outer wall, partition walls provided inside the outer wall, and cells each surrounded by the partition walls as well as extending to an axial direction of the body; and drying the formed body, characterized in that the forming step comprises a step of receiving the formed body being extruded on a cradle provided with receiving faces having a V-shaped cross section with a cut at an apex of the V shape so that an angle of at least one face of the outer wall relative to the horizontal plane is 15 to 45 degrees; and the drying step comprises a step of drying the formed body in a state of being received on the cradle (the second aspect). In the V-shaped cross section in the second aspect, a length of the cut from the apex of one side of the V shape toward an end portion is preferably 5 to 30% of a length of a vertical section relative to an axial direction of the outer wall face on a face forming the one side and the cradle preferably receives the formed body so that an angle of at least one face of the outer wall on the cradle relative to the horizontal plane is 35 to 45 degrees.

The present invention provides third a method for manufacturing a honeycomb structure, the method comprising steps of: forming, by extrusion, a formed body having an outer wall, partition walls provided inside the outer wall, and cells each surrounded by the partition walls as well as extending to an axial direction of the body; and drying the formed body, characterized in that the forming step comprises a step of receiving at least one face of the outer wall of the formed body being extruded on a cradle; and the drying step comprises a step of drying the formed body on the cradle which receives the formed body so that an angle of at least one face of the outer wall relative to the horizontal plane is 15 to 45 degrees (the third aspect). In the third aspect, the cradle in the drying step preferably has two faces with a V-shaped cross section. Also the cradle in the drying step preferably has two faces having a V-shaped cross section with a cut at an apex of the V shape.

In the first to third aspects, the honeycomb structure preferably contains ceramics as a main component and the main component preferably contains silicon carbide.

BEST MODE FOR CARRYING OUT THE INVENTION

Methods for manufacturing a honeycomb structure according to the first to third aspects of the present invention are described below in detail with reference to the concrete embodiments. However, the present invention is not restricted to the following embodiments. Incidentally, in the present description, the expression "section" means a section perpendicular to the axial direction shown in FIG. 1, unless otherwise specified.

Figure 1:
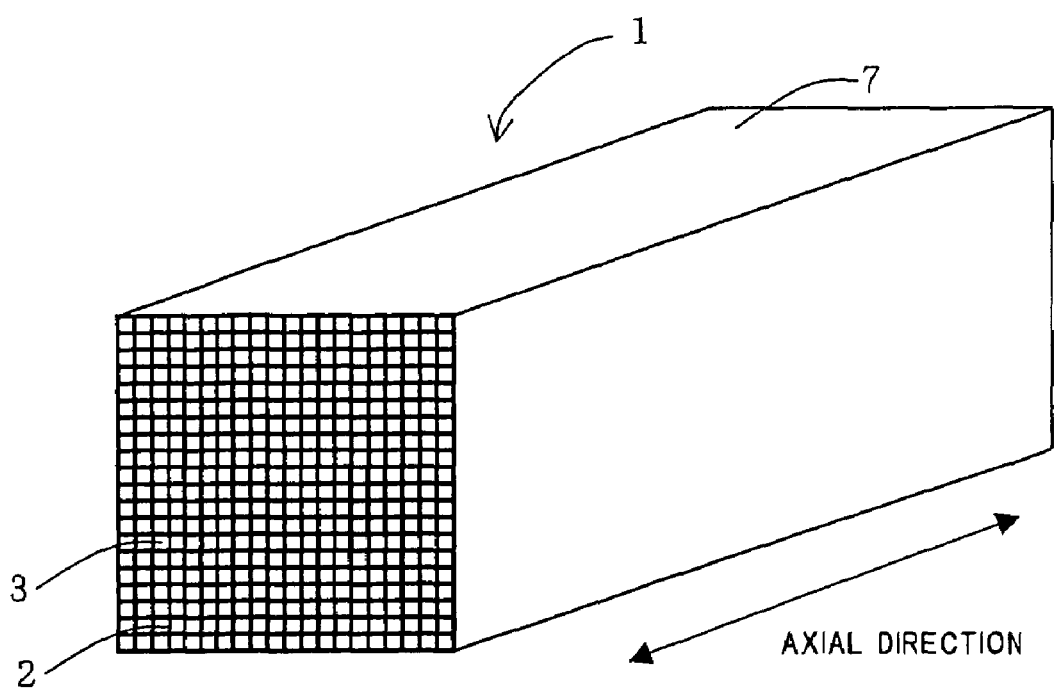
FIG. 1 is a schematic perspective view showing an embodiment of the formed body according to the present invention.

A forming step according to the first to third aspects of the present invention is a step of forming, by extrusion, a formed body 1 having an outer wall 7, partition walls 2 provided inside the outer wall 7, and cells 3 each surrounded by the partition walls 2 as well as extending to an axial direction of the body, for example, as shown in FIG. 1. A drying step is a step of drying the formed body 1 being extruded to remove moisture.

Figure 2:
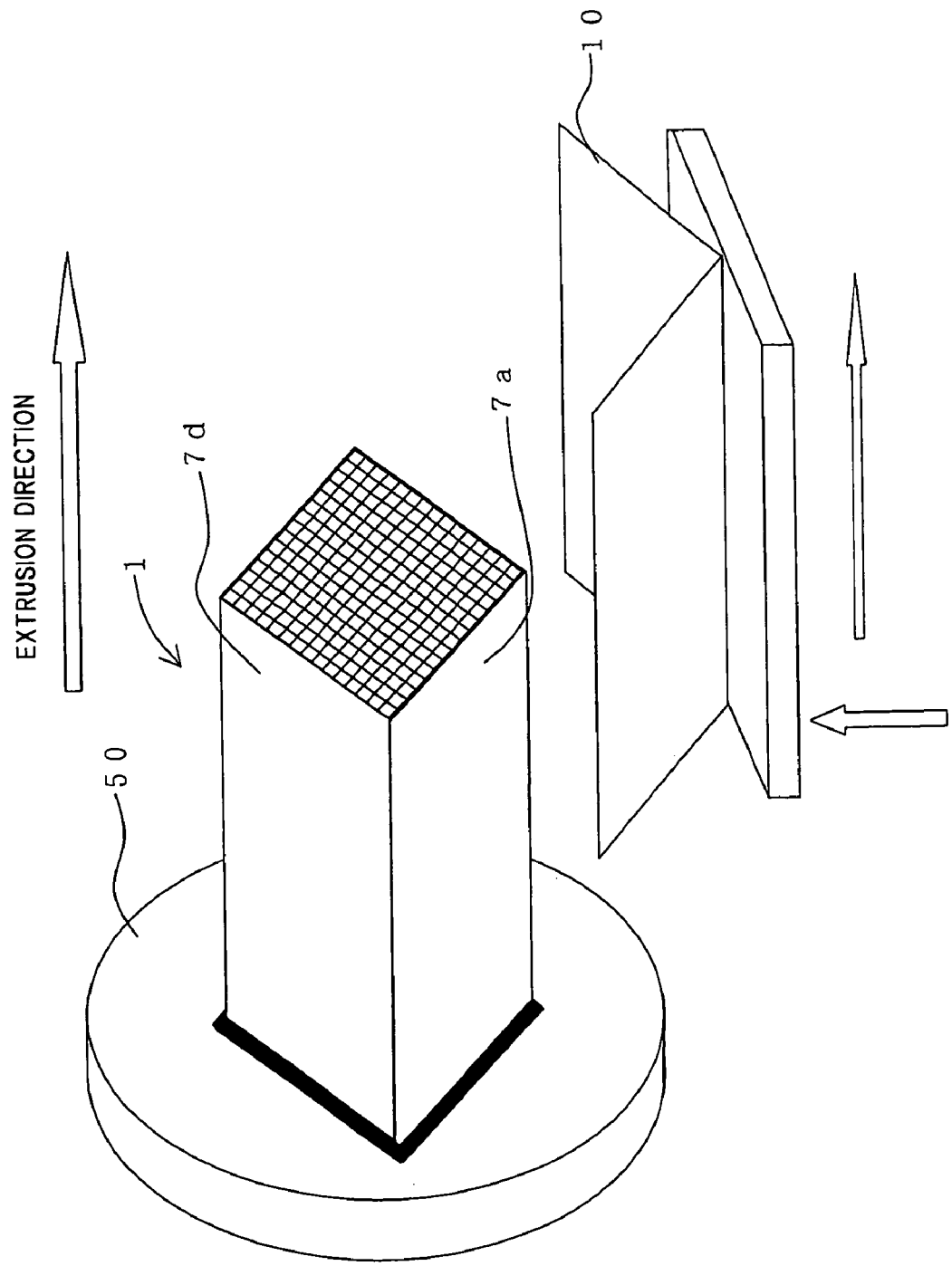
FIG. 2 is a schematic perspective view showing an embodiment of the forming step according to the present invention.
Figure 3:
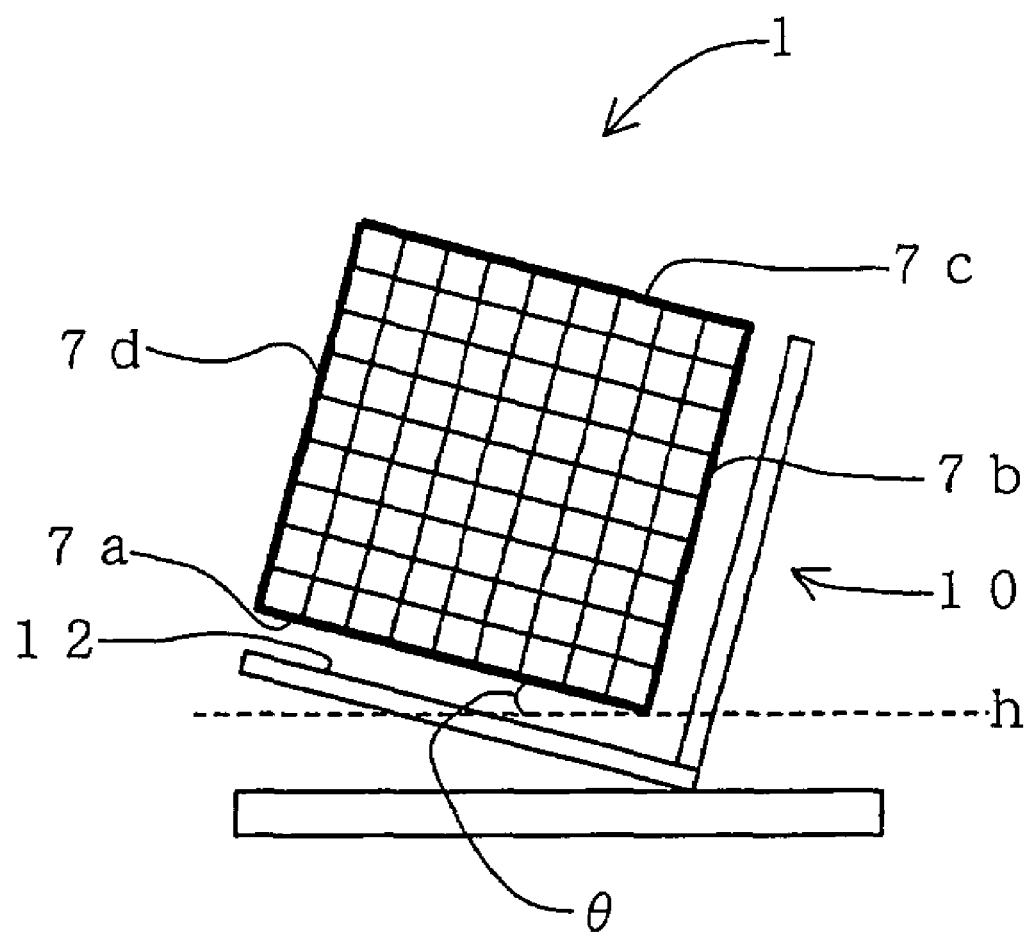
FIG. 3 is a schematic front view showing an embodiment of receiving a formed body on a cradle according to the present invention.

Important characteristics of the first aspect are as follows. As shown in FIGS. 2 and 3, the forming step includes receiving the formed body 1 being extruded from a die 50 of an extruder (not shown) on a cradle 10 so that an angle θ of at least one of faces 7a and 7b of the outer wall on the cradle 10 relative to the horizontal plane h, i.e., an angle θ formed by at least one of sides formed by the outer wall on the cradle in a cross section of the formed body and a horizontal line on the same cross section is 15 to 35 degrees. Furthermore, the drying step includes drying the formed body 1 in a state of being received on the cradle 10, i.e., in a state in which the angle θ is 15 to 35 degrees. In FIGS. 2 and 3, reference numerals 7c and 7d respectively designate faces of the outer wall.

By employing such a method, it is possible to inhibit distortion and cross sectional deformation in forming and drying the formed body and to obtain the finished honeycomb structure with reduced deformation.

Figure 7:
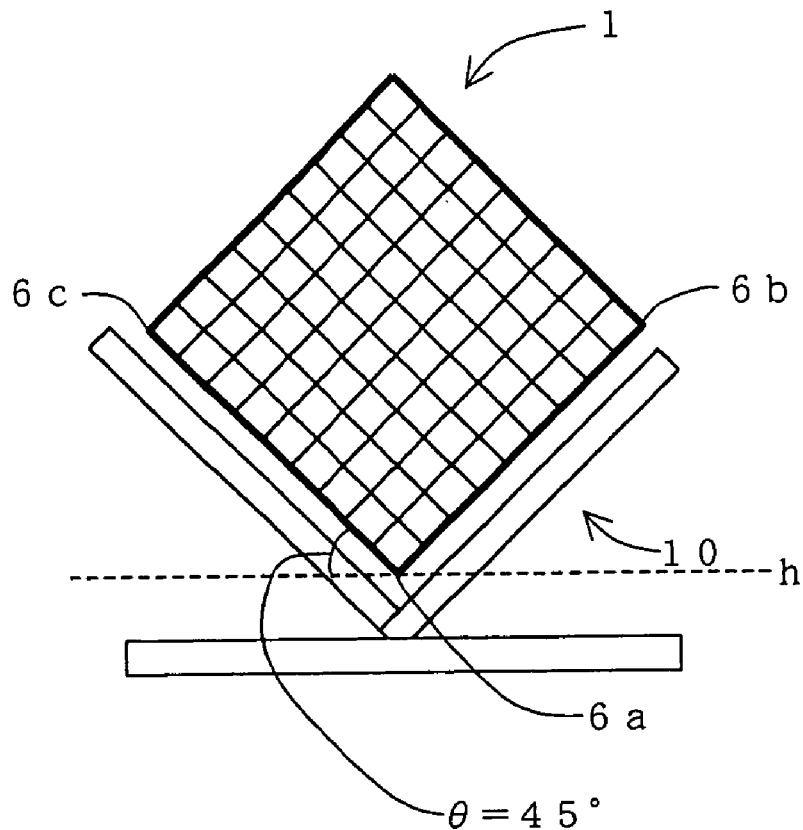
FIG. 7 is a schematic front view showing still another embodiment of receiving a formed body on still another type of cradle according to the present invention.
Figure 10:
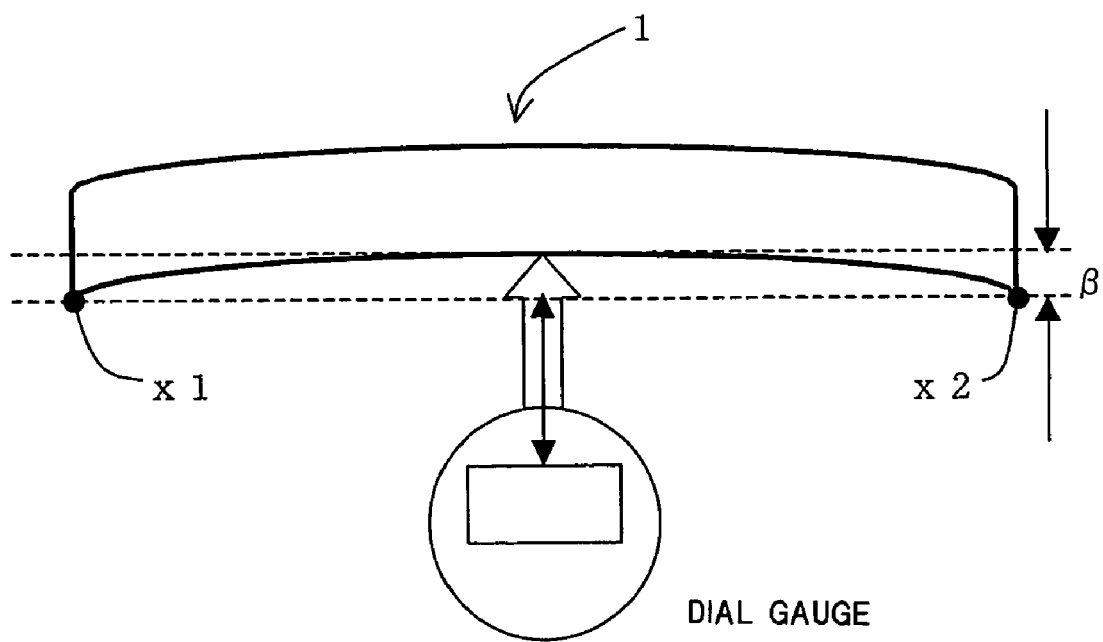
FIG. 10 is a schematic side view showing a method for measuring distortion of a formed body according to the present invention.

For example, as shown in FIG. 7, if the formed body being extruded is received on the cradle 10 with the V-shaped section such that the angle θ is 45 degrees and dried in this state, it is possible to effectively inhibit distortion shown in FIG. 10 in the drying step. However, if the cradle 10 is moved upward from a lower position for alignment and the formed body is placed on the cradle in the forming step as shown in FIG. 2, alignment of the formed body 1 and the cradle with each other is difficult. A slight deviation of a dimension, an angle, or a position of the formed body 1 or the cradle makes excessive stress liable to be applied to any one, two, or more of corner portions 6a, 6b, and 6c of the formed body 1 shown in FIG. 7, which is likely to cause deformation due to collapse of the corner portions.

Figure 8:
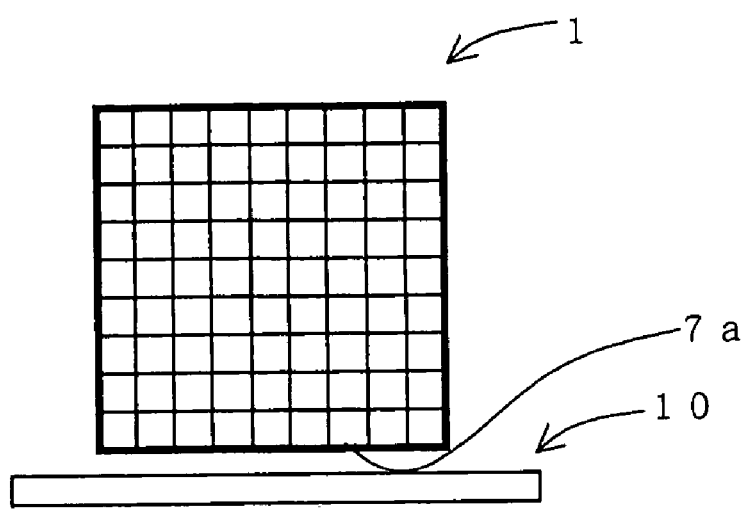
FIG. 8 is a schematic front view showing another embodiment of receiving a formed body on another type of cradle according to the present invention.

On the other hand, if the formed body being extruded is received on a cradle for receiving one face of the outer wall, i.e., the cradle with which the angle θ substantially becomes 0 degree and dried in this state as shown in FIG. 8, deformation due to collapse of the corner portions is less liable to occur in the forming step. However, distortion shown in FIG. 10 becomes more liable to occur in the drying step.

On the other hand, if the formed body being extruded is received on a cradle 10 so that the angle θ is 15 to 35 degrees and dried in this state as shown in FIG. 3, for example, the outer wall face 7a of the formed body can be received on a receiving face 12 of the cradle 10 in the forming step even if there is a slight deviation of a dimension, an angle, or a position of the formed body 1 or the cradle 10. Therefore, deformation due to collapse of the corner portions is less liable to occur and distortion shown in FIG. 10 becomes less liable to occur in the drying step.

Although it is essential only that the cradle used in the first aspect can receive the formed body so that the angle θ is 15 to 35 degrees, the cradle preferably includes two faces forming a V-shaped cross section as shown in FIG. 3 because the two faces of the formed body can be received and distortion can effectively be inhibited in the drying step. An angle of an apex of the V shape is preferably the same as an angle formed by two faces of the outer wall of the formed body on the cradle. For example, if a cross sectional shape of the formed body is a rectangle, the V shape preferably has an apex of 90 degrees. Lengths of two sides of the V shape are preferably 70% or more of sectional lengths of the two faces of the outer wall on the cradle so as to disperse the stress applied to the formed body.

If the formed body is received on the cradle having the two faces forming the V-shaped section as described above, there are two outer faces on the cradle and therefore each the outer face has the angle θ and it is essential only that either one of the angles θ be in a scope of the invention or in a preferable range in the first, second, or third aspect. If the sectional shape of the formed body is a rectangle, i.e., if each an interior angle is 90 degrees, either one of the angles θ is necessarily in a range of 0 to 45 degrees.

Figure 4:
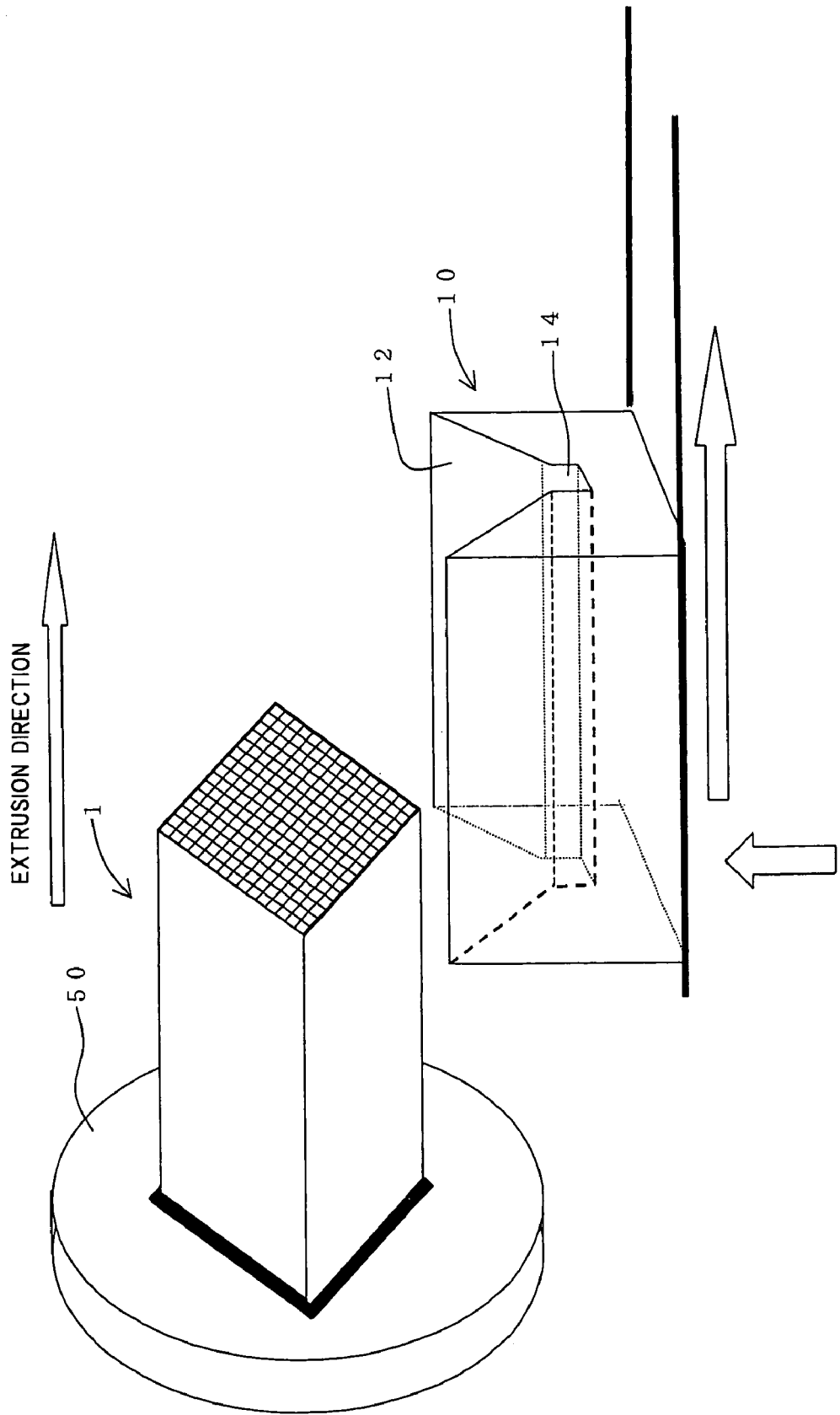
FIG. 4 is a schematic perspective view showing another embodiment of the forming step according to the present invention.
Figure 5:
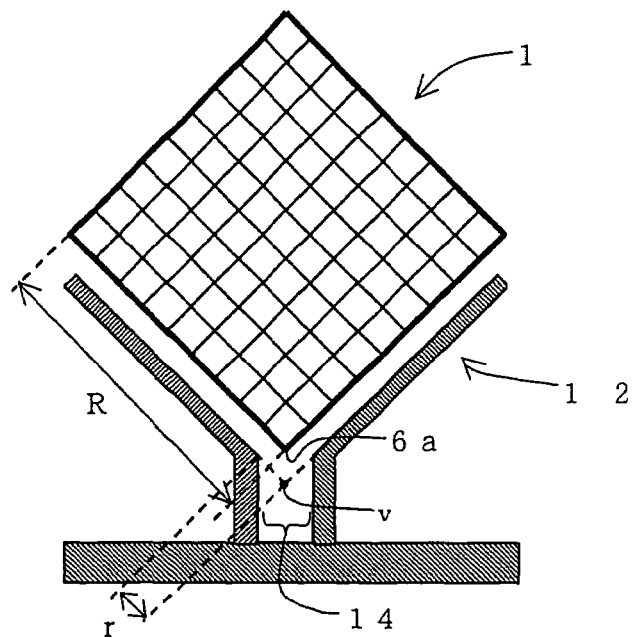
FIG. 5 is a schematic front view showing another embodiment of receiving a formed body on another type of cradle according to the present invention.

Next, description is made on the second aspect of the present invention. Important characteristics of the second aspect are as follows. An extruding step includes receiving the formed body 1 being extruded on a cradle 10 having a V-shaped cross section with a cut 14 at an apex of the V shape so that an angle θ is 15 to 45 degrees, preferably 35 to 45 degrees, and more preferably about 45 degrees and a drying step includes drying the formed body in a state of being received on the cradle 10 as shown in FIGS. 4 and 5. By using the cradle having such a shape, the corner portion 6a of the formed body 1 and the cradle are not in contact with each other. As a result, even if there is a slight deviation of a dimension, an angle, or a position of the formed body 1 or the cradle, excessive stress is not applied to the corner portion 6a of the formed body 1 and it becomes easy to receive the outer wall faces of the formed body on the whole faces of the cradle. Therefore, deformation due to collapse of the corner portion is less liable to occur and distortion shown in FIG. 10 becomes less liable to occur in the drying step.

In the second aspect, a length r of the cut 14 from an apex v of one side of the V-shaped cross section toward an end portion shown in FIG. 5 is not especially restricted. However, if the length r is too long, i.e., if the cut 14 is too large, an area of the cradle for receiving the formed body being extruded becomes too small, excessive stress becomes liable to be applied to outer faces in boundary positions between the faces and the cut of the cradle, and deformation due to collapse of the formed body becomes liable to occur. On the other hand, if the length r of the cut is too small, an effect of avoiding application of the excessive stress to the corner portion of the formed body according to the invention becomes less likely to be exerted. Therefore, the length r of the cut is preferably 5 to 30%, more preferably 10 to 20%, and especially preferably about 15% of a sectional length R of the outer wall faces on the faces of the cradle when the formed body is received on the cradle. In the first or second aspect, the angle θ in receiving the formed body and the angle θ in drying are not necessarily the same as each other and can exert respective effects if they are in scopes of the respective aspects of the invention in the respective steps.

Figure 6A:
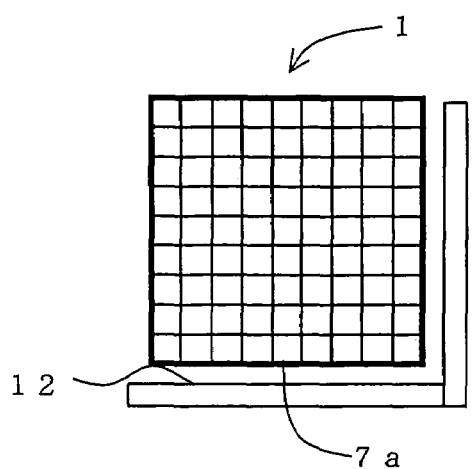
FIG. 6(a) is a schematic front view showing an embodiment of receiving a formed body on another type of cradle according to the present invention and FIG. 6(b) is a schematic front view showing a state in which an angle of the cradle is changed.
Figure 6B:
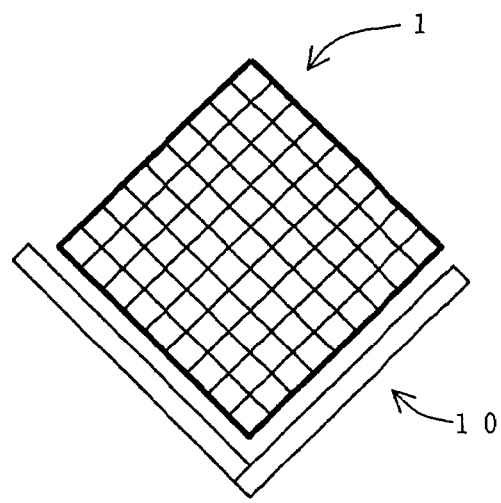

Next, description is made on the third aspect of the present invention. Important characteristics of the third aspect are as follows. An extruding step includes receiving one face 7a of the outer wall of the formed body being extruded on a cradle 10 as shown in FIG. 8 and the drying step includes a step of drying the formed body 1 on the cradle which receives the formed body so that the angle θ is 15 to 45 degrees as shown in FIG. 3 or 6(b). By employing such a method, it is possible to inhibit deformation due to collapse of the corner portions in the forming step and to inhibit deformation due to distortion of the formed body in the drying step.

In the third aspect, the cradle used in the forming step and the cradle used in the drying step may be the same as or different from each other. If they are the same as each other, the formed body 1 being extruded is received such that one face 7a of the outer wall becomes substantially horizontal by substantially horizontally orienting one receiving face 12 of the cradle and receiving the formed body 1 on the receiving face 12 as shown in FIG. 6(a) in the extruding step and the formed body 1 can be dried by changing an angle of the cradle so that the angle θ becomes 15 to 45 degrees as shown in FIG. 6(b) in the drying step, for example.

In the third aspect, the cradle used in the drying step preferably has a shape shown in FIG. 3 or 6(b), i.e., has two faces forming a V-shaped cross section so that the angle θ is easily in the scope of the invention. It is also preferable, as shown in FIG. 5, that the cradle has a V-shaped cross section with a cut 14 at an apex of the V shape so that the angle θ is 15 to 45 degrees like the cradle used in the second aspect because it is possible to easily inhibit deformation due to collapse of the corner portions in replacing the formed body from the cradle used in the forming step to the cradle used in the drying step, for example, and deformation due to distortion in the drying step.

The formed body according to the first to third aspects of the invention preferably contains ceramics as a main component when the formed body is used for various filters and carriers and the main component especially preferably contains silicon carbide from the viewpoint of heat resistance when the formed body is used for DPF and the like, for example. The formed body according to the first to third aspects preferably has at least two faces, preferably has planes as outer faces, and more preferably has a shape of a rectangular prism. Especially when a cross sectional shape is a rectangle, the invention exerts its effect best. Therefore, the cross sectional shape of the formed body is more preferably a rectangle and especially preferably a square.

If the forming method in the first to third aspects is the method for extrusion, the method is not especially restricted in other points. For example, the forming can be carried out by mixing and kneading a raw material obtained by mixing metallic silicon and silicon carbide in certain proportions and adding thereto water, an organic binder, surfactant, a pore-forming agent, a sintering assistant, and the like to form clay and extruding the clay with an extruder or by extruding the raw material while kneading the raw material with the extruder. At this time, the extruded formed product is received on the cradle according to the first to third aspects.

Although the drying means in the first to third aspects is not especially restricted, it is preferable to carry out drying by microwave drying and/or hot-air drying. Although the microwave drying has an advantage of rapid drying, the formed body may not be dried sufficiently only by the microwave drying in some cases. Therefore, the combined use of the microwave drying and the hot-air drying is preferable and it is more preferable to carry out the hot-air drying after removing moisture to some extent by the microwave drying.

Although a microwave output in the microwave drying step is not especially restricted, it is preferably an output of about 0.5 to 3 kW/kg. If the microwave output is low, a drying time becomes long and therefore the formed body may be collapsed under its own weight. If the microwave output is high, problems such as burning of the binder occur. It is preferable to remove 30 to 80% by mass of the total moisture to be removed in the microwave drying step and to remove the rest of the moisture in the hot-air drying step in the viewpoint of prevention of distortion. Moreover, it is preferable to use a hot-air drying means of a ventilating or hot-air circulating type in the hot-air drying.

In manufacturing the honeycomb structure and especially in manufacturing the honeycomb structure containing ceramics as a main component, in general, the formed body is fired in the firing step after the drying step. A firing temperature and a firing atmosphere in the firing step are different depending on the raw materials and a person skilled in the art can select a firing temperature and a firing atmosphere suitable for the selected ceramic raw material. For example, if the honeycomb structure contains metallic silicon and silicon carbide as main components, the formed body is heated and degreased in a nitrogen atmosphere and then fired in an inert atmosphere such as argon to thereby obtain the honeycomb structure. If the honeycomb structure is used as the filter such as DPF, it is preferable to carry out a plugging step for plugging one end portions of adjacent cells which are on opposite sides to each other with a material similar to that used for manufacturing the filter. Although this step may be carried out in any stage after the forming step, it is preferable to fire the plugged portions in general and therefore it is preferable to carry out the plugging step before the firing step. In this way, the whole formed body can be fired at a time.

The present invention will concretely be described hereinafter in terms of examples. However the present invention is not limited to these examples.

EXAMPLE 1

Figure 9:
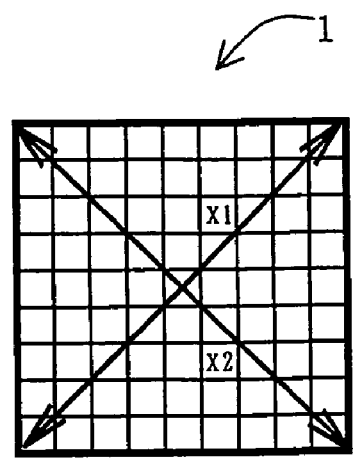
FIG. 9 is a schematic front view showing a method for measuring cross sectional deformation of a formed body according to the present invention.

As a raw material, a mixed powder containing 80% by mass of SiC powder and 20% by mass of metal Si powder was prepared. To the powder, methyl cellulose, hydroxypropoxyl methyl cellulose, surfactant, and water were added to prepare clay having plasticity. This clay was extruded into a formed body in a shape of a rectangular prism having a square cross section with a length of a side of 50 mm and having a length of 400 mm as shown in FIG. 1. At this time, the formed body extruded from the extruder was received on a cradle shown in FIGS. 2 and 3 so that an angle θ was 15 degrees. Next, microwave drying was carried out with the formed body received on the cradle, i.e., while maintaining the angle θ of 15 degrees and then hot-air drying was carried out. This operation was carried out for 100 formed bodies. In order to study cross sectional deformation of the formed body after drying, a difference between lengths of diagonal lines of an end face of each the formed body, i.e., an absolute value of (x1−x2) in FIG. 9 was measured and variation in the difference was presented as a standard deviation (σ) of the diagonal line differential in Table 1. Furthermore, distortion amounts β of the obtained formed bodies were measured and the result was presented in Table 1. The distortion amount β was obtained by measuring, by using a dial gauge, a difference between an average of vertical positions of two points, i.e., x1 and x2 of longitudinal opposite ends of the formed body placed on a predetermined jig and a vertical position of an intermediate point of an outer wall between the two points as shown in FIG. 10.

COMPARATIVE EXAMPLE 1

Forming, drying, and evaluation were conducted and the result was presented in Table 1 similarly to Example 1 except that the angle θ in the forming step and the drying step was 45 degrees by using the cradle having the V-shaped cross section as shown in FIG. 7.

COMPARATIVE EXAMPLE 2

Forming, drying, and evaluation were conducted and the result was presented in Table 1 similarly to Example 1 except that the formed body being extruded was received on the plane cradle shown in FIG. 8 and dried in this state.

TABLE 1

| | Example 1 | Comparative Example 1 | Comparative Example 2 |
|---|---|---|---|
| Standard deviation (σ) of diagonal line differential, mm | 0.03 | 0.5 | 0.01 |
| Average of distortion amounts (β), mm | 0.4 | 0.3 | 1.8 |
| Comprehensive evaluation of deformation | Satisfactory | Unsatisfactory | Unsatisfactory |

From Table 1, though the distortion amount was small, σ was large and variation in deformation due to collapse of the corner portions was large in the method of the comparative example 1. In the method of the comparative example 2, though σ was small, the distortion amount was large. On the other hand, in the method of the example 1, both σ and the distortion amount were small, cross sectional deformation and deformation due to distortion were effectively inhibited, and stable dimensions were obtained.

EXAMPLES 2 to 4

Forming, drying, and evaluation were conducted and the result was presented in Table 2 similarly to Example 1 except that the following cradle was used. The cradle had the V-shaped cross section with the cut 14 at an apex of the V shape, the angle θ was 45 degrees, and the size of the cut, i.e., a ratio of a length r of the cut to the length R (100) of the outer wall was each value presented in Table 2.

TABLE 2

| | Example 2 | Example 3 | Example 4 |
|---|---|---|---|
| Size of cut | 10 | 30 | 50 |
| Standard deviation (σ) of diagonal line differential, mm | 0.03 | 0.05 | 0.5[(*1)] |
| Average of distortion amounts (β), mm | 0.4 | 0.4 | 0.6 |
| Comprehensive evaluation of deformation | Satisfactory | Satisfactory | Unsatisfactory |

[(*1)]Deformation occurred on boundaries of the cut.

In all the methods of the examples 2 to 4, collapse of the corner portions was small and the distortion amounts could be inhibited in a relatively satisfactory range. However, in the method of the example 4 on conditions of this example, because the size of the cut was too large, excessive stress which was excessively large for the formed body used here was applied to the boundary portions between the cradle and the cut, deformation occurred in the portions, and as a result, σ became large.

Industrial Applicability

As described above, with the methods for manufacturing the honeycomb structure according to the first to third aspects of the invention, both the deformation in the forming step and in the drying step can be inhibited at a time. Therefore, the method for manufacturing the honeycomb structure of the invention is suitable for use in manufacturing the honeycomb structure used for catalyst carriers, various filters, and the like.

The invention claimed is:

1. A method for manufacturing a honeycomb structure, the method comprising steps of:
    forming, by extrusion, a formed body having an outer wall, partition walls provided inside the outer wall, and cells each surrounded by the partition walls as well as extending to an axial direction of the body; and
    drying the formed body,
    characterized in that the forming step comprises a step of receiving the formed body being extruded on a cradle which receives the formed body so that an angle of at least one face of the outer wall on the cradle relative to the horizontal plane is 15 to 35 degrees;
    the drying step comprises a step of drying the formed body in a state of being received on the cradle.

2. The method for manufacturing a honeycomb structure according to claim 1, wherein the cradle has two faces having a V-shaped cross section.

3. A method for manufacturing a honeycomb structure, the method comprising steps of:
    forming, by extrusion, a formed body having an outer wall, partition walls provided inside the outer wall, and cells each surrounded by the partition walls as well as extending to an axial direction of the body; and
    drying the formed body,
    characterized in that the forming step comprises a step of receiving the formed body being extruded on a cradle which has receiving faces having a V-shaped cross section with a cut at an apex of the V shape, and which receives the formed body so that an angle of at least one face of the outer wall on the cradle relative to the horizontal plane is 15 to 45 degrees; and
    the drying step comprises a step of drying the formed body in a state of being received on the cradle.

4. The method for manufacturing a honeycomb structure according to claim 3, wherein a length of the cut from the apex of one side of the V shape toward an end portion is 5 to 30% of a length of a vertical section relative to an axial direction of the outer wall face on a face forming the one side.

5. The method for manufacturing a honeycomb structure according to claim 3, wherein the cradle receives the formed body so that the angle of at least one face of the outer wall on the cradle relative to the horizontal plane is 35 to 45 degrees.

6. A method for manufacturing a honeycomb structure, the method comprising steps of:

forming, by extrusion, a formed body having an outer wall, partition walls provided inside the outer wall, and cells each surrounded by the partition walls as well as extending to an axial direction of the body; and drying the formed body, characterized in that the forming step comprises a step of receiving one face of the outer wall of the formed body being extruded on a cradle;

the drying step comprises a step of drying the formed body on a cradle which receives the formed body so that an angle of at least one face of the outer wall relative to the horizontal plane is 15 to 45 degrees;

the same cradle is used in the forming step and the drying step; and wherein the cradle has faces for receiving the formed body and having a V-shaped cross section with a cut at an apex of the V shape, the face of the outer wall contacting the faces of the cradle.

7. The method for manufacturing a honeycomb structure according to claim 6, wherein the cradle has two faces for receiving the formed body and having a V-shaped cross section.

8. The method for manufacturing a honeycomb structure according to claim 1, wherein the honeycomb structure contains ceramics as a main component.

9. The method for manufacturing a honeycomb structure according to claim 3, wherein the honeycomb structure contains ceramics as a main component.

10. The method for manufacturing a honeycomb structure according to claim 6, wherein the honeycomb structure contains ceramics as a main component.

11. The method for manufacturing a honeycomb structure according to claim 8, wherein the main component contains silicon carbide.

12. The method for manufacturing a honeycomb structure according to claim 9, wherein the main component contains silicon carbide.

13. The method for manufacturing a honeycomb structure according to claim 10, wherein the main component contains silicon carbide.

* * * * *